INVENTORS
WILLIAM J. GESEK &
JAMES H. BRAGDON
BY
Carl V. Olson
ATTORNEY

Feb. 2, 1965 W. J. GESEK ETAL 3,168,700

SEQUENTIAL PULSE GENERATOR EMPLOYING PLURALITY OF CASCADED CIRCUITS COUPLED THROUGH SHIFT GATES AND HAVING INDIVIDUAL OUTPUT GATES

Filed March 20, 1963 3 Sheets-Sheet 2

INVENTORS
WILLIAM J. GESEK &
JAMES H. BRAGDON
BY
Carl V. Olson
ATTORNEY

INVENTORS
WILLIAM J. GESEK &
BY JAMES H. BRAGDON
Carl V. Olson
ATTORNEY

United States Patent Office 3,168,700
Patented Feb. 2, 1965

3,168,700
SEQUENTIAL PULSE GENERATOR EMPLOYING PLURALITY OF CASCADED CIRCUITS COUPLED THROUGH SHIFT GATES AND HAVING INDIVIDUAL OUTPUT GATES

William J. Gesek, Moorestown, and James H. Bragdon, Cherry Hill, N.J., assignors to Radio Corporation of America, a corporation of Delaware Filed Mar. 20, 1963, Ser. No. 266,751
10 Claims. (Cl. 328—62)

This invention relates to a sequential pulse generator and has for its object the provision of improved means for generating a controllable number of sequential pulses on separate output lines. These pulses may be used in a computer to control the sequential performance of elementary parts of machine instructions having varying numbers of elementary parts.

According to an example of the invention there are provided a plurality of cascaded preselection flip-flops coupled in cascade through shift gates and having individual output gates. There is also a last preselection flip-flop having an output gate. An oscillation-controlled means is coupled to the shift gates and output gates of the cascaded preselection flip-flops to cause the generation of sequential output clock pulses therefrom. Transfer gates are associated with the outputs of some of said cascaded preselection flip-flops to operate in response to a pulse number control signal to cause the next following clock pulses to be generated from the last preselection flip-flop.

*Description*

Figure 2A:
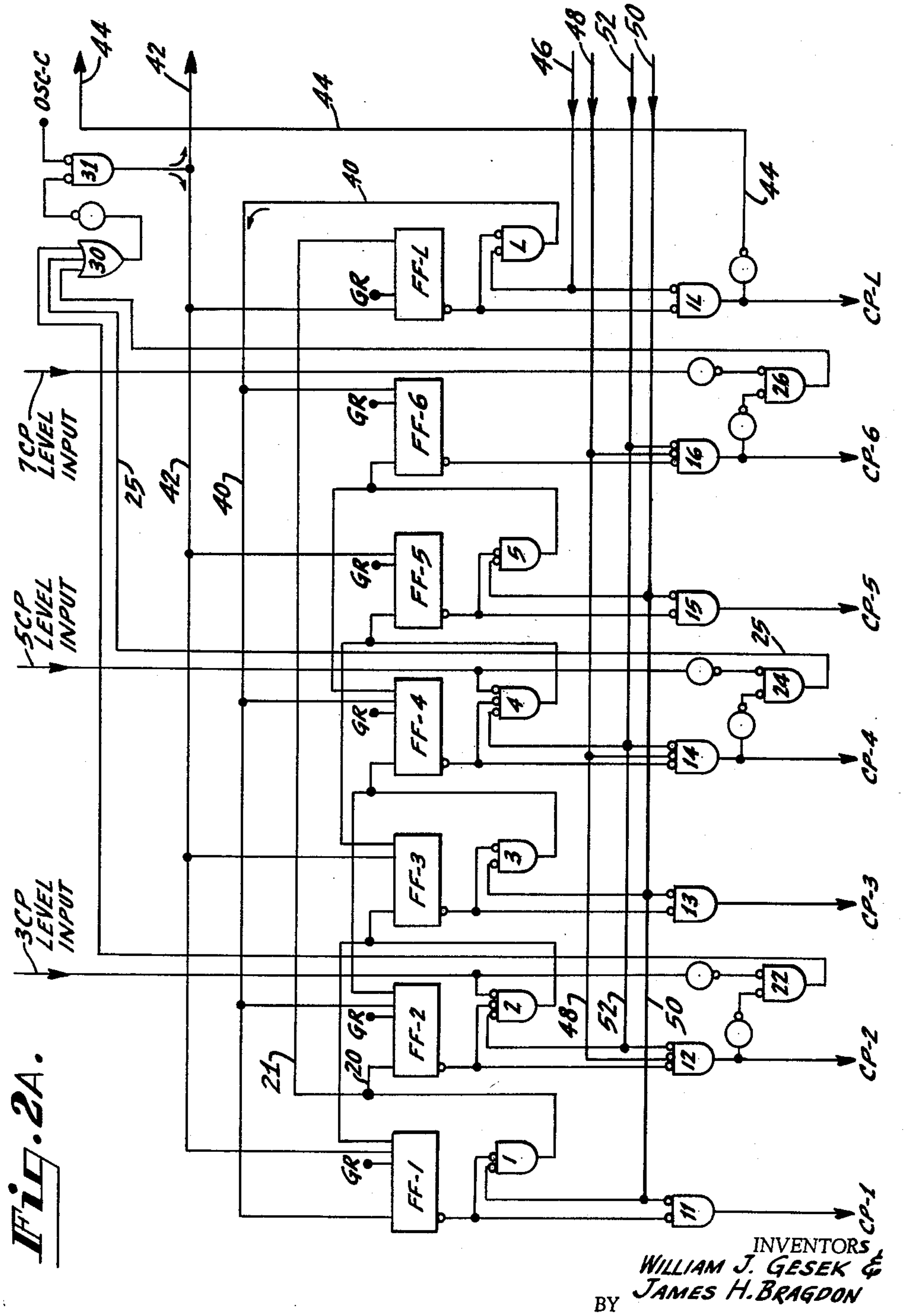
FIGS. 2A and 2B show a clock pulse generator constructed according to the teachings of the invention.
Figure 3:
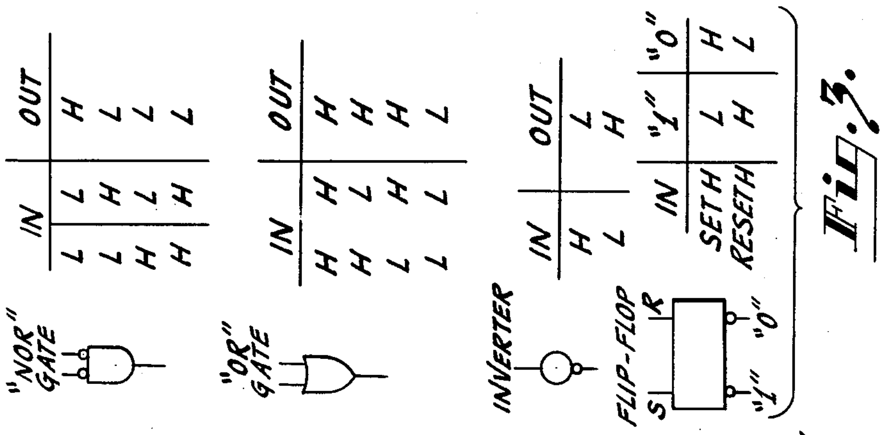
FIG. 3 is a key defining the logic element symbols in the system of FIGS. 2A and 2B in terms of associated truth tables.
Figure 2B:
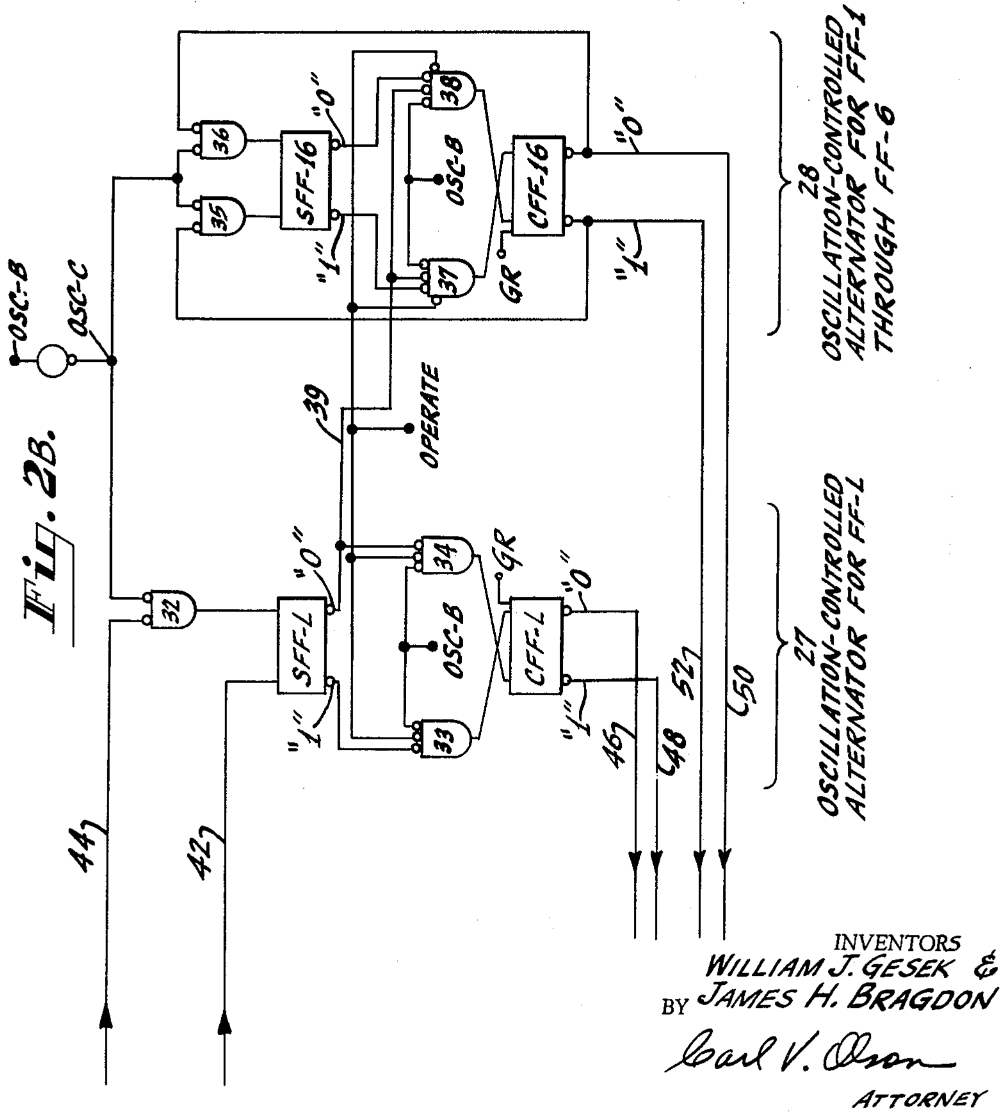

Referring now in greater detail to FIGS. 2A and 2B, the system shown is made up of conventional circuit elements represented by symbols which are defined by associated "truth" tables in FIG. 3. The system of FIGS. 2A and 2B includes as many preselection flip-flops FF–1, FF–2, FF–3, FF–4, FF–5, FF–6 and FF–L (L for "last") as the maximum number of clock pulses desired from a corresponding number of clock pulse output terminals CP–1, CP–2, CP–3, CP–4, CP–5, CP–6 and CP–L. The number of output clock pulses generated at any particular time is three, five or seven depending on which one of the input pulse number signal level lines 3CP, 5CP and 7CP is energized.

The "1" outputs of preselection flip-flops FF–1 through FF–L are connected to inputs of corresponding output "nor" gates 11, 12, 13, 14, 15, 16 and 1L. The "1" outputs of the preselection flip-flops FF–1, FF–2, FF–3, FF–4, FF–5 and FF–L are also connected to inputs of corresponding shift "nor" gates 1, 2, 3, 4, 5 and L. The outputs of shift "nor" gates 1, 2, 3, 4 and 5 are connected in the manner of a shift register or counter, to set inputs of next following preselection flip-flops and to reset inputs of next preceding preselection flip-flops. Each of preselection flip-flops FF–1 through FF–6 together with their associated transfer and output gates constitute cascaded circuits. The last preselection flip-flop FF–L together with its shift gate L and output gate 1L constitutes a last circuit. The output of shift "nor" gate L is connected over bus 40 to the set input of preselection flip-flop FF–1 and to the reset inputs of preselection flip-flops FF–2, FF–4 and FF–6.

The pulse number control signal input lines 3CP and 5CP are connected respectively to inputs of shift "nor" gates 2 and 4. The input lines 3CP, 5CP and 7CP are connected respectively through inverters to inputs of transfer "nor" gates 22, 24 and 26. Other inputs of transfer "nor" gates 22, 24 and 26 are connected through respective inverters to the outputs of respective output "nor" gates 12, 14 and 16. Outputs of transfer "nor" gates 22, 24 and 26 are connected to inputs of an "or" gate 30 having an output connected through an inverter to an input of a "nor" gate 31. The output terminal OSC–C of a source of oscillations is also connected to an input of "nor" gate 31. The output of "nor" gate 31 is connected over a bus 42 to reset inputs of preselection flip-flops FF–1, FF–3 and FF–5, and to a set input of preselection flip-flop FF–L.

Bus 42 also extends into FIG. 2B to the set input of a "last pulse" synchronizing flip-flop SFF–L. The output of "output" "nor" gate 1L in FIG. 2A is connected through an inverter and through a line 44 extending into FIG. 2B to an input of a "nor" gate 32. Another input of "nor" gate 32 receives oscillations from a terminal OSC–C. The output of "nor" gate 32 is connected to the reset input of the synchronizing flip-flop SFF–L.

The "nor" gate 32, the synchronizing flip-flop SFF–L, the "nor" gates 33 and 34, and the control flip-flop CFF–L in FIG. 2B constitute an oscillation-controlled means or an alternator means 27 to control the gating out of the last output clock pulse CP–L. The "nor" gates 35 and 36, the synchronizing flip-flop SFF–16, the "nor" gates 37 and 38, and the control flip-flop CFF–16 constitute an oscillation-controlled means or alternator means 28 to control the gating out of the other clock pulses CP–1 through CP–6.

The "1" output of synchronizing flip-flop SFF–L is connected to an input of "nor" gate 33 which has its output connected to a reset input of control flip-flop CFF–L, and the "0" output of flip-flop SFF–L is connected to an input of "nor" gate 34 which has its output connected to the set input of flip-flop CFF–L.

The "nor" gates 35 and 36 have inputs connected to the OSC–C terminal and have outputs connected to the set and reset inputs, respectively, of synchronizing flip-flop SFF–16. The "1" output of flip-flop SFF–16 is connected to an input of "nor" gate 37 which has its output connected to the reset input of contol flip-flop CFF–16. The "0" output of the flip-flop SFF–16 is connected to an input of the "nor" gate 38 which has its output connected to a set input of control flip-flop CFF–16. Output terminals OSC–B of a source of oscillations are connected to inputs of "nor" gates 33, 34, 37 and 38. A terminal OPERATE is connected to inputs of "nor" gates 33, 34, 37 and 38. The "0" output of synchronizing flip-flop SFF–L is also connected over a line 39 to inputs of "nor" gates 37 and 38 to provide an interlocking connection between alternator means 27 and 28.

The "0" output of control flip-flop CFF–L is connected over bus 46 to inputs of shift "nor" gate L and output "nor" gate 1L, and the "1" output is connected over bus 48 to inputs of output "nor" gates 12, 14 and 16. The "0" output of control flip-flop CFF–16 is connected over bus 50 to inputs of shift and output "nor" gates 1, 11, 3, 13, 5 and 15, and the "1" output is connected over bus 52 to inputs of shift and output "nor" gates 2, 12, 4, 14 and 16.

*Operation*

The operation of the system will now be described with reference to FIGS. 1, 2A and 2B. Initially, a general reset signal is applied to all of terminals GR to cause "last" control flip-flop CFF–L to be reset; to cause the other control flip-flop CFF–16 to be set; to cause cascaded preselection flip-flops FF–1 through FF–6 to be reset; and to cause the "last" preselection flip-flop FF–L to be set. The "low" output of the last preselection flip-flop FF–L and the "low" signal on the "0" output bus 46 of control flip-flop CFF–L enable gate L and causes a signal over bus 40 to set preselection flip-flop FF–1, and these signals also enable gate 1L and cause a signal over line 44 tending to enable gate 32. On the next negative half-cycle of the oscillation OSC–C, gate 32 resets switch flip-flop SFF–L and gate 35 sets switch flip-flop SFF–16. The foregoing states the conditions of all flip-flops following general reset.

Figure 1:
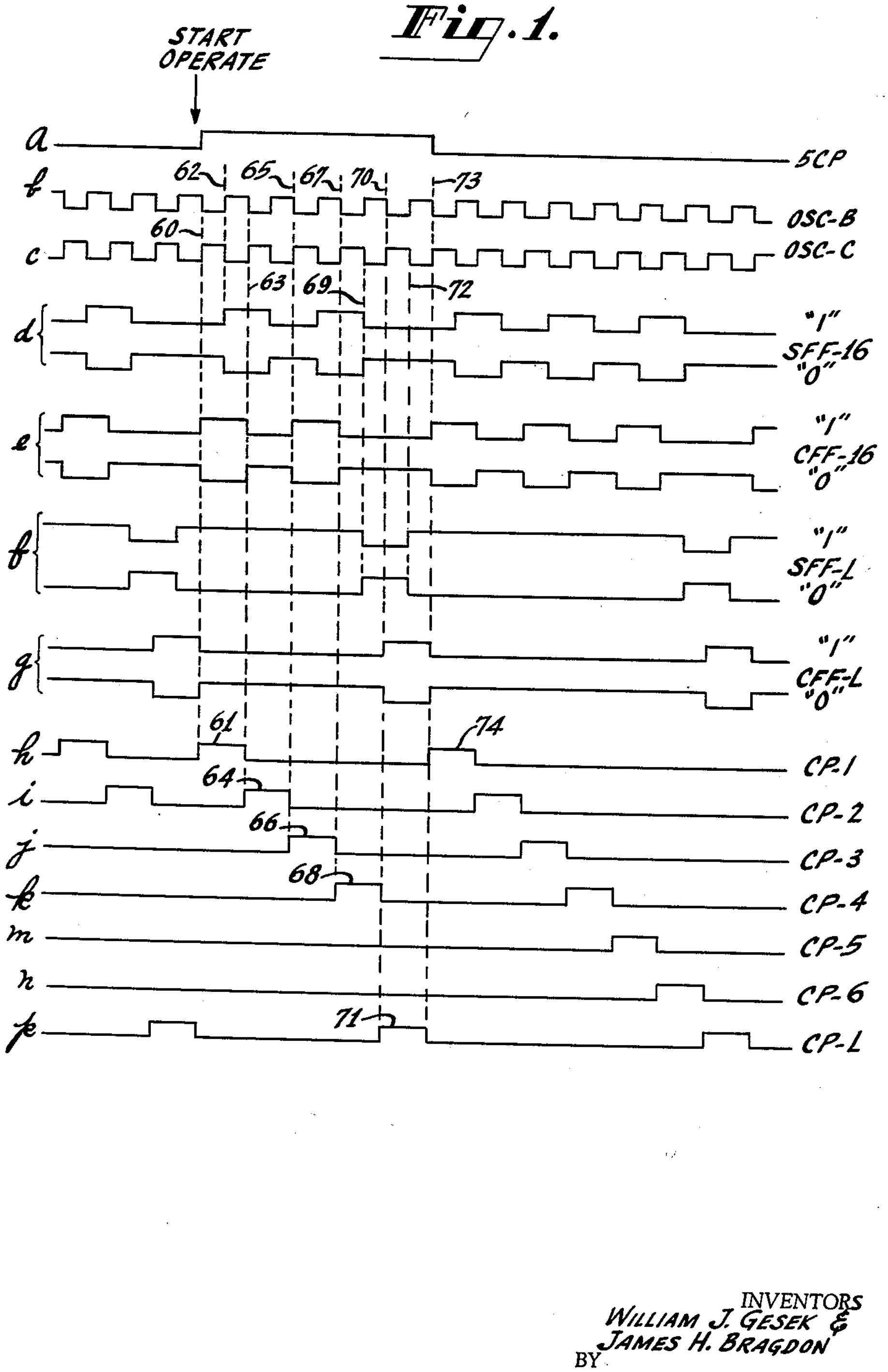
FIG. 1 is a chart of waveforms which will be referred to in describing the operation of the invention in generating controllable numbers of output clock pulses.

FIG. 1 illustrates timing relationships in the system of FIGS. 2A and 2B during the generation of three clock pulses, five clock pulses and seven clock pulses, in that order. The following description of the operation of the system assumes that it is desired to generate five clock pulses, and that the clock pulse number determining signal input line 5CP is "high" during the interval represented by the waveform of FIG. 1*a*.

A start or operate signal applied to terminal OPERATE enables gate 34 (FIG. 2B) so that the next negative half cycle at time 60 of oscillation OSC–B (FIG. 1*b*) goes through gate 34 and causes control flip-flop CFF–L (FIG. 1*g*) to be set, and the operate signal enables gate 37 so that the negative half cycle of oscillation OSC–B goes through gate 37 and causes control flip-flop CFF–16 (FIG. 1*e*) to be reset. The "0" output of control flip-flop CFF–16 enables output gate 11 providing a CP–1 (FIG. 1*h*) clock output pulse 61, and enables shift gate 1 which acts over line 20 to set flip-flop FF–2, and acts over line 21 to reset flip-flop FF–L.

At the end of the negative half cycle of oscillation OSC–B and the beginning of the negative half cycle of oscillation OSC–C at time 62, gate 36 is enabled causing synchronizing flip-flop SFF–16 (FIG. 1*d*) to be reset and its "0" output enables gate 38 for the next negative half cycle of oscillation OSC–B which at time 63 sets control flip-flop CFF–16 (FIG. 1*e*). The "0" output on lead 50 of control flip-flop CFF–16 then no longer passes through output gate 11 with the result that output clock pulse CP–1 is terminated. The "1" output on lead 52 of control flip-flop CFF–16 goes through output gate 12 causing the CP–2 clock pulse 64 to appear at output terminal CP–2 (FIG. 1*i*), and it goes through shift gate 2 to set flip-flop FF–3 and to reset flip-flop FF–1 if shift gate 2 is enabled by a "low" signal level on the three-clock-pulse signal input lead 3CP. Lead 3CP would be "high" if three output clock pulses CP–1, CP–2 and CP–L were desired. It will be assumed that input lead 3CP is "low" and that input lead 5CP is "high" for the purpose of providing five output clock pulses CP–1, CP–2, CP–3, CP–4 and CP–L.

The next negative half cycle of oscillations OSC–B at time 65 resets control flip-flop CFF–16 (FIG. 1*e*) so that its "0" output goes through output gate 13 as a CP–3 output clock pulse 66 (FIG. 1*j*) and goes through shift gate 3 to set flip-flop FF–4 and reset flip-flop FF–2.

Then, the next following negative half cycle of oscillation OSC–B at time 67 causes control flip-flop CFF–6 (FIG. 1*e*) to be set so that its "1" output goes through output gate 14 as a CP–4 output clock pulse 68 and goes to, but is blocked by shift gate 4 which has a "high" input level from lead 5CP. The inputs to transfer gate 24 enable the gate so that a signal goes over line 25, through "or" gate 30, and an inverter to gate 31. When the next negative half cycle of oscillation OSC–C (FIG. 1*c*) is present at time 69 at the input of gate 31, the output of gate 31 acts over line 42 to reset flip-flops FF–1, FF–3 and FF–5 and to set the last flip-flop FF–L, and it acts over line 42 to set the synchronizing flip-flop SFF–L (FIG. 1*f*). The "0" output of flip-flop SFF–L goes "high" so that it no longer enables gates 37 and 38 with the result that control flip-flop CFF–16 stops alternating, i.e., remains set, at the time 70 of the next negative half cycle of oscillation OSC–B. The "1" output of flip-flop SFF–L enables gate 33 for the next negative half cycle of oscillations OSC–B at time 70. The output of gate 33 resets control flip-flop CFF–L (FIG. 1*g*) so that its "1" output goes "high" and inhibits output gate 14 and terminates the CP–4 output pulse 68. The "0" output of control flip-flop CFF–L goes through enabled gate L and over line 40 to set flip-flop FF–1 and to reset flip-flops FF–2, FF–4 and FF–6. The "0" output of control flip-flop CFF–L also goes through enabled gate 1L to provide a last CP–L output clock pulse 71. The output clock pulse 71 also goes through an inverter and over a line 44 to enable gate 32 for the next occurring negative half cycle of oscillation OSC–C at time 72, at which time synchronizing flip-flop SFF–L is reset. The "0" output of flip-flop SFF–L enables gate 34 for the next negative half cycle of oscillation OSC–B at time 73 which sets control flip-flop CFF–L so that its "0" output goes "high" and terminates the last CP–L control pulse 71.

The "0" output ("low") of synchronizing flip-flop SFF–L also enables gate 37 so that the negative half cycle of oscillation OSC–B at time 73 resets control flip-flop CFF–16.

The "0" output of flip-flop CFF–16 enables output gate 11 to provide the CP–1 output clock pulse 74 of the next following series of clock pulses. The generation of clock pulses then repeats in the manner that has been described. The number of clock pulses generated in each series of clock pulses depends on the "high" input signal level applied to one of the pulse number determining input lines 3CP, 5CP and 7CP. If there is a "high" signal level on input line 3CP, the system generates output pulses CP–1, CP–2 and CP–L. If there is a "high" signal level on input line 5CP, the system generates output pulses CP–1, CP–2, CP–3, CP–4 and CP–L. If there is a "high" signal level on input line 7CP, the system generates output pulses CP–1, CP–2, CP–3, CP–4, CP–5, CP–6 and CP–L. The same scheme can be applied to the generation of any desired number of output clock pulses.

What is claimed is:

1. Means for generating a controllable number of sequential clock pulses, comprising a plurality of cascaded circuits and a last circuit, each of said circuits having an output lead, a first oscillation-controlled means coupled to said cascaded circuits to cause successive clock pulse outputs from said cascaded circuits, a second oscillation-controlled means coupled to said last circuit, and transfer gate means responsive to outputs of said cascaded circuits and to a pulse number determining input signal to stop said first oscillation-controlled means and activate said second oscillation-controlled means.

2. Means for generating a controllable number of sequential clock pulses on separate output leads, comprising a plurality of cascaded circuits and a last circuit, each of said circuits being coupled to a respective one of said output leads, a first oscillation-controlled means coupled to said cascaded circuits to cause successive clock pulse outputs from said cascaded circuits, a second oscillation-controlled means coupled to said last circuit, at least one pulse member control signal input terminal, and at least one transfer gate means responsive to a signal on said control signal input terminal and a clock pulse output of one of said cascaded circuits and operative to stop said first oscillation-controlled means and activate said second oscillation-controlled means.

3. Means for generating a controllable number of sequential clock pulses on separate output leads, comprising a plurality of cascaded circuits and a last circuit, each of said circuits being coupled to a respective one of said output leads, a first oscillation-controlled means coupled to said cascaded circuits to cause successive clock pulse outputs from said cascaded circuits, a second oscillation-controlled means interlocked with said second oscillation-controlled means and coupled to said last circuit, a plurality of pulse member control signal input terminals, and a plurality of transfer gate means each responsive to a signal on one of said input terminals and a clock pulse output of one of said cascaded circuits and operative to stop said first oscillation-controlled means and activate said second oscillation-controlled means.

4. Means for generating a controllable number of sequential clock pulses on separate output lines, comprising a plurality of preselection flip-flops, shift gates coupling all but a last one of said flip-flops in cascade, a plurality of output gates coupled between respective preselection flip-flops and respective output lines, oscillation-controlled means coupled to said shift gates and output gates to provide successive output clock pulses, and at least one transfer gate means responsive to a respective output clock pulse and a respective input signal to cause a following clock pulse from the last one of said preselection flip-flops.

5. Means for generating a controllable number of sequential clock pulses on separate output lines, comprising a plurality of preselection flip-flops, shift gates coupling all but a last one of said flip-flops in cascade, a plurality of output gates coupled between respective preselection flip-flops and respective output lines, a first oscillation-controlled means coupled to said shift gates and output gates associated with all but the last of said flip-flops to provide successive output clock pulses, a second oscillation-controlled means coupled to the output gate associated with the last flip-flop.

a pulse number input signal terminal, and a transfer gate means responsive to a respective output clock pulse and a signal on said input signal terminal to stop said first oscillation-controlled means and activate said second oscillation-controlled means.

6. Means for generating a controllable number of sequential clock pulses on separate output lines, comprising a plurality of preselection flip-flops, shift gates coupling all but a last one of said flip-flops in cascade, a plurality of output gates coupled between respective preselection flip-flops and respective output lines, a first oscillation-controlled means coupled to said shift gates and output gates associated with all but the last of said flip-flops to provide successive output clock pulses, a plurality of pulse number determining input signal terminals, and a plurality of transfer gate means each having an input coupled to a respective one of said terminals and an input coupled to one of said clock pulse output lines, said transfer gate means being operative to stop said first oscillation-controlled means and activate said second oscillation-controlled means.

7. Means for generating a controllable number of sequential clock pulses on separate output leads, comprising a plurality of cascaded circuits coupled in cascade through shift gates, and a last circuit, output gates coupling outputs of respective circuits to said separate output leads, a first oscillation-controlled means coupled to shift gates and output gates associated with said cascaded circuits to provide sequential output clock pulses from said cascaded circuits, a second oscillation-controlled means coupled to the output gate associated with said last circuit, and at least one transfer gate responsive to a control input signal, to the gated output of an associated cascaded circuit and to said first oscillation-controlled means to stop the output of said first oscillation-controlled means and cause an output from said second oscillation-controlled means, whereby to determine the number of sequential output clock pulses from said cascaded circuits which precede an output clock pulse from said last circuit.

8. Means for generating a controllable number of sequential clock pulses on separate output leads, comprising a plurality of cascaded preselection flip-flops coupled in cascade through shift gates, and a last preselection flip-flop, output gates coupling outputs of respective preselection flip-flops to said separate output leads, a first oscillation-controlled means coupled to shift gates and output gates associated with said cascaded preselection flip-flops to provide sequential output clock pulses from said cascaded preselection flip-flop, a second oscillation-controlled means coupled to the output gate associated with said last preselection flip-flop, and at least one transfer gate means responsive to a control input signal, to the gated output of an associated cascaded preselection flip-flop and to said first oscillation-controlled means to stop the output of said first oscillation-controlled means and cause an output from said second oscillation-controlled means, whereby to determine the number of sequential output clock pulses from said cascaded preselection flip-flops which precede an output clock pulse from said last preselection flip-flop.

9. A generator of a controllable number of sequential clock pulses for operating a computer, comprising a plurality of cascaded circuits and a last circuit, each of said circuits having an output lead for a respective output clock pulse, a first alternator means having one output coupled to even ones of said cascaded circuits and having another output coupled to odd ones of said cascaded circuits to cause successive clock pulse outputs from said cascaded circuits, a second alternator means interlocked with said first alternator means and having one output coupled to even ones of said cascaded circuits and having another output coupled to said last circuit, and transfer gates each having an input coupled to the output lead of an associated cascaded circuit, means to apply a pulse number control signal to enable any desired one of said transfer gates, the outputs of said transfer gates being coupled to at least one of said first and second alternator means to stop the first alternator means and activate the second alternator means, whereby the pulse member control signal determines the number of output clock pulses which precede the last output clock pulse.

10. A generator of a controllable number of sequential clock pulses for operating a computer, comprising a plurality of cascaded preselection flip-flop circuits and a last preselection flip-flop circuit, each of said circuits having an output gate coupled to an output lead for a respective output clock pulse, a first alternator means having one output coupled to even ones of said cascaded circuits and having another output coupled to odd ones of said cascaded circuits to cause successive clock pulse outputs from said cascaded circuits, a second alternator means interlocked with said first alternator means and having one output coupled to even ones of said cascaded circuits and having another output coupled to said last circuit, and transfer gates each having an input coupled to the output lead of an associated cascaded circuit, means to apply a pulse number control signal to enable any desired one of said transfer gates, the outputs of said transfer gates being coupled to at least one of said first and second alternator means to stop the first alternator means and activate the second alternator means, whereby the pulse number control signal determines the number of output clock pulses which precede the last output clock pulse.

No references cited.